US011369017B2

(12) United States Patent
Dudar

(10) Patent No.: US 11,369,017 B2
(45) Date of Patent: Jun. 21, 2022

(54) SYSTEMS AND METHODS UTILIZING A VEHICLE FOR DETECTING AND RESPONDING TO A POWER OUTAGE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/099,532

(22) Filed: Nov. 16, 2020

(65) Prior Publication Data
US 2022/0159814 A1    May 19, 2022

(51) Int. Cl.
H05B 47/155  (2020.01)
H05B 47/19   (2020.01)
H05B 47/11   (2020.01)
G06V 20/56   (2022.01)
B60Q 1/14    (2006.01)

(52) U.S. Cl.
CPC .......... *H05B 47/155* (2020.01); *G06V 20/56* (2022.01); *H05B 47/11* (2020.01); *H05B 47/19* (2020.01); *B60Q 1/1415* (2013.01); *B60Q 2300/30* (2013.01)

(58) Field of Classification Search
CPC ...... H05B 45/10; H05B 47/10; H05B 47/105; H05B 47/11; H05B 47/115; H05B 47/175; H05B 47/19; H05B 47/155; B60Q 1/0023; B60Q 1/52; B60Q 2400/00; B60Q 2300/45; B60Q 2300/30; F02D 41/26; F02D 41/263; F02D 2200/70; F02D 2200/701
See application file for complete search history.

(56) References Cited

U.S. PATENT DOCUMENTS

| 8,764,242 B2 * | 7/2014 | Recker ................ H02J 7/00308 |
| | | 362/276 |
| 9,556,812 B2 * | 1/2017 | Ozkan ..................... F02D 41/26 |
| 9,849,830 B1 * | 12/2017 | Salter ....................... F21S 43/16 |
| 9,969,320 B2 | 5/2018 | Kim et al. |
| 9,983,013 B1 * | 5/2018 | Krunic ................. G06K 9/6277 |
| 10,132,643 B2 | 11/2018 | Thompson et al. |
| 2020/0086786 A1 * | 3/2020 | Mackey .................. B60Q 9/00 |

OTHER PUBLICATIONS

Thakur, Rajeev, "Infrared Sensors For Autonomous Vehicles", Intech Open, Dec. 20, 2017, 17 pages.

* cited by examiner

*Primary Examiner* — Haissa Philogene
(74) *Attorney, Agent, or Firm* — Brandon Hicks; Eversheds Sutherland (US) LLP

(57) ABSTRACT

The disclosure provides systems and methods for detecting and responding to a power outage. The methods use sensors of vehicles to detect an indication of a power outage. Once the power outage is validated, the lighting systems of the vehicles are used to illuminate locations so that pedestrians can walk along sidewalks or through parking garages. For example, the vehicles can be arranged to provide lighting at selected locations.

23 Claims, 6 Drawing Sheets

SYSTEMS AND METHODS UTILIZING A VEHICLE FOR DETECTING AND RESPONDING TO A POWER OUTAGE

BACKGROUND

A power outage may be localized or it may be widespread. A localized power outage may result from a car hitting a power pole, a downed power line, or a blown transformer. A widespread power outage may occur from a weather-related event.

During a power outage, streets and parking lots become dark, and walking around may become difficult. For example, it can be difficult for a person to find their vehicle or walk home during a power outage. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure provides systems and methods for detecting and responding to a power outage. The methods use sensors of vehicles to detect an indication of a power outage. The indication is written along with a location, time of day, and date for validation as a power outage. For example, the indication can be written to a blockchain where a fleet of vehicles are nodes in a network.

Once the power outage is validated, the lighting systems of the vehicles are used to illuminate locations so that pedestrians can walk along sidewalks or through parking garages. For example, the vehicles can be controlled or directed to provide lighting at selected locations. Sensors of the vehicle can be used to determine when and where light is needed. In addition, the vehicles can be provided with map locations and moved, positioned, and oriented as necessary to illuminate the map locations.

The systems and methods further detect and validate an end of a power outage. For example, after a power outage has been validated, the methods use sensors of vehicles to detect an indication of an end of the power outage. As above, the indication is written along with a location, time of day, and date to validate that the power outage has ended. These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
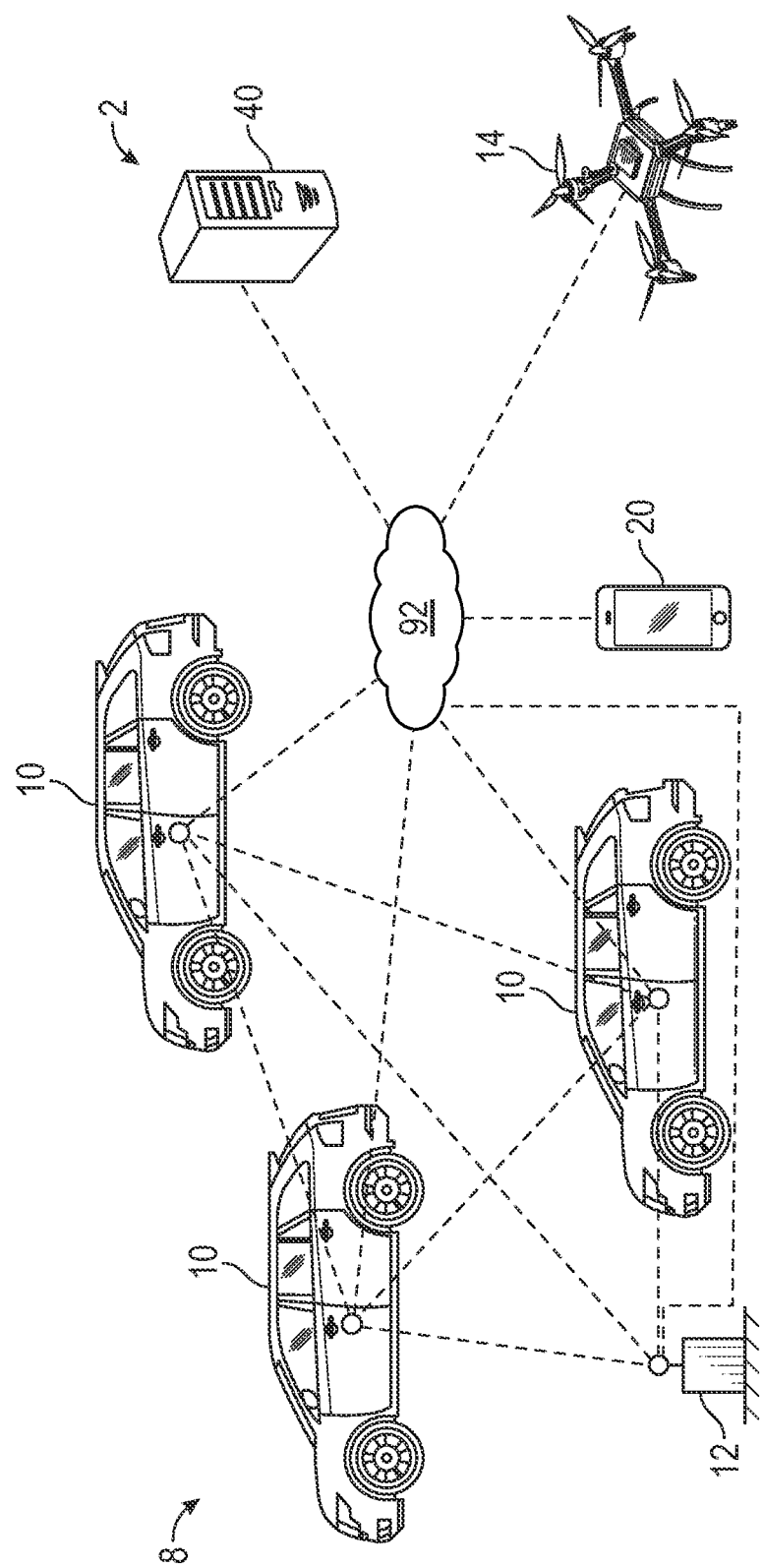
FIG. 1 illustrates an example network including a fleet of vehicles in accordance with the present disclosure.

FIG. 1 illustrates an exemplary network 2 with nodes including a fleet 8 of vehicles 10, a road-side unit 12, a drone 14 (e.g., unmanned aerial vehicle (UAV)), a mobile device 20, and a remote server 40. In addition, sensors (e.g., sensors of the vehicles 10) may be configured as independent nodes. The nodes of the network 2 may be directly connected to one another or indirectly connected to one another via other nodes or network connections.

As an example, the network 2 may be configured as a blockchain network. In blockchain, information exists and is reconciled as a shared database (e.g., each of the vehicles in the fleet have a copy of the blockchain and the server has a copy of the blockchain), with no central data store. Instead, each record is stored as a "block", which contains record information, a timestamp, and a link to a previous block. As blocks cannot be changed once they are created, the blockchain provides that the power outage data is immutable.

The nodes are configured to write and/or read information pertaining to the blockchain. For example, writing to the blockchain can include signing transactions and reading can include analyzing information on the blockchain. Some "edge" nodes may delegate reading or writing operations to other nodes. In particular, the sensors of the vehicle 10 may delegate reading and writing operations to the vehicle 10 as it has more computational capacity. In some examples, sensors may be configured to write to the blockchain but not read from the blockchain.

When a node writes data to the blockchain, the data includes a cryptographic signature that can be verified or authenticated before the data is written to the blockchain. Authentication prevents an unauthorized source from writing data to the blockchain that may trigger a determination of an occurrence of a power outage and the associated response, as described in further detail below.

For example, when a vehicle 10 is added to the fleet 8, a new blockchain address is created along with public and private keys for the vehicle 10. The vehicle 10 is authenticated through a number of public/private key encrypted handshake communications (e.g., using a hash and the blockchain address). Once authenticated, the vehicle 10 can write data to the blockchain (e.g., the data is signed using one or more shared encryption keys).

Figure 2:
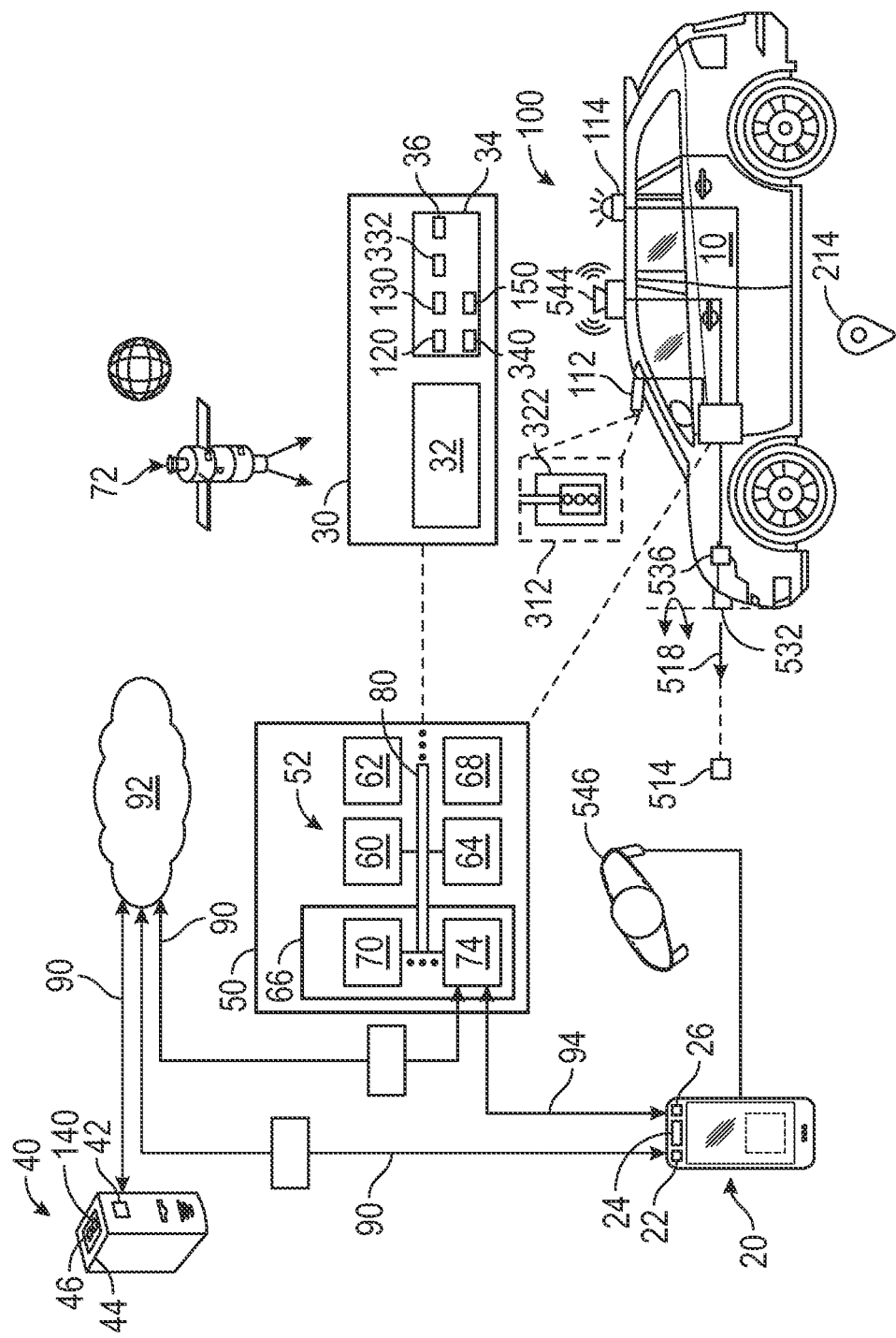
FIG. 2 illustrates an example functional schematic of a computational environment including a vehicle and a server in accordance with the present disclosure.

FIG. 2 illustrates an exemplary computing and communication environment including the vehicle 10, the mobile device 20, and the server 40 in communication with one another.

Although illustrated as a car, the vehicle 10 may take the form of another passenger or commercial automobile such as, for example, a truck, a sport utility, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 10 may be configured as an electric vehicle (EV). More particularly, the vehicle 10 may include a battery EV (BEV) drive system. The vehicle 10 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicles 10 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicles 10 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5.

The mobile device 20 includes a processor 22 and a memory 24. The memory 24 stores a mobile device application 26 including program instructions that, when executed by the processor 22, performs aspects of the disclosed methods described below including receiving notifications and sending confirmations of an occurrence of a power outage, and providing a location for illumination. As such, the mobile device 20 and mobile device application 26 may be part of a detection and response system 100 described in further detail below including transmitting information for such systems.

The server 40 (e.g., one or more servers) may be part of a cloud-based computing infrastructure, and may be associated with and/or include a Telematics Service Delivery Network (SDN) that provides digital data services to the vehicle 10. The server 40 includes a processor 42 and a memory 44. The memory 44 includes a server application 46 including program instructions that, when executed by the processor 42, preforms aspects of the disclosed methods including determining an occurrence of a power outage and organizing the fleet 8 of vehicles 10 to illuminate locations. As such, the server 40 and server application 46 may be part of the power outage detection and response system 100 described in further detail below or may transmit information for such systems.

The vehicle 10 includes an automotive computer 30. The automotive computer 30 includes a processor 32 and a memory 34. The memory 34 includes a vehicle application 36 including program instructions that, when executed by the processor 32, preforms aspects of the disclosed methods including detecting and sending an indication of a power outage, receiving or determining information including locations to illuminate, and controlling external vehicle lighting systems to illuminate locations. As such, the automotive computer 30 and vehicle application 36 may be part of the power outage detection and response system 100 described in further detail below or may transmit information for such systems.

The memory 24, 34, 44 may be a non-transitory computer-readable memory storing program code. The memory can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The vehicle 10 further includes a Vehicle Controls Unit (VCU) 50. The VCU 50 includes a plurality of electronic control units (ECUs) 52 disposed in communication with the automotive computer 30. The automotive computer 30 may be or include an electronic vehicle controller. The automotive computer 30 and the VCU 50 may be installed in an engine compartment of the vehicle 10 (as schematically illustrated) or elsewhere in the vehicle 10.

The ECUs 52 may control aspects of vehicle operation and communication using inputs from human drivers, inputs from a vehicle system controllers, and/or via wireless signal inputs received via wireless channel(s) from other connected devices such as a mobile device, the server 40, among others. The ECUs 52 (e.g., when configured as nodes in a CAN bus 80 described in further detail below) may each include a central processing unit (CPU), a CAN controller, and/or a transceiver.

The VCU 50 may coordinate the sharing of data between vehicle systems, connected servers (e.g., server 40) and devices (e.g., mobile device 20). The VCU 50 can include or communicate with any combination of the ECUs 52, such as, for example, a Body Control Module (BCM) 60, an Engine Control Module (ECM) 62, a Transmission Control Module (TCM) 64, a Telematics Control Unit (TCU) 66, a Restraint Control Module (RCM) 68, and the like. The ECUs 52 described with respect to the VCU 50 are provided for exemplary purposes only, and are not intended to be limiting or exclusive. Control and/or communication with other control modules not shown in FIG. 2 is possible, and such control is contemplated.

The ECUs 52 can communicate with one another and the automotive computer 30 by way of a Controller Area Network (CAN) bus 80. Accordingly, the automotive computer 30 may retrieve information from, send information to, and otherwise interact with the ECUs 52 to perform steps described according to embodiments of the present disclosure.

The CAN bus 80 may be configured as a multi-master serial bus standard for connecting two or more of the ECUs 52 as nodes using a message-based protocol that can be configured and/or programmed to allow the ECUs 52 to communicate with each other. The CAN bus 80 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration.

The CAN bus 80 may connect CAN bus nodes (e.g., the ECUs 52) to each other through a two-wire bus, which may be a twisted pair having a nominal characteristic impedance. The CAN bus 80 may also be accomplished using other communication protocol solutions, such as Media Oriented Systems Transport (MOST) or Ethernet. In other aspects, the CAN bus 80 may be a wireless intra-vehicle CAN bus.

ECUs 52 are now described in further detail.

The BCM 60 generally includes an integration of sensors, vehicle performance indicators, and variable reactors associated with vehicle systems. The BCM 60 may include processor-based power distribution circuitry that can control functions associated with the vehicle body such as lights (including lights 532 of an external lighting system described in further detail below), windows, security, door locks and access control, and various comfort controls. The BCM 60 may also operate as a gateway for bus and network interfaces to interact with remote ECUs (not shown in FIG. 1).

The BCM 60 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc. The BCM 60 may be configured for vehicle energy management, exterior lighting control (e.g., module 150), wiper functionality, power window and door functionality, heating ventilation and air conditioning systems, and driver integration systems. In other aspects, the BCM 60 may control auxiliary equipment functionality, and/or is responsible for integration of such functionality.

In one aspect, the detection and response system 100 may control systems and sensors using, at least in part, the BCM 60. In particular, the BCM 60 may control sensors (e.g., light sensor 114 and camera 112) to make measurements that may indicate a power outage as described below; and the BCM may use sensors (e.g., camera 112, LIDAR or motion sensors 544, sensors that monitor connectivity to mobile devices 20) and exterior lights (e.g., headlights 532) to provide illumination in response to a power outage as described below.

The TCU 66 can be configured to provide vehicle connectivity to wireless computing systems onboard and off-board the vehicle 10 and is configurable for wireless communication between the vehicle 10 and other systems, computers, and modules. For example, the TCU 66 includes a Navigation (NAV) system 70 for receiving and processing a GPS signal from a GPS 72, a Bluetooth® Low-Energy Module (BLEM) 74, a Wi-Fi transceiver, an Ultra-Wide Band (UWB) transceiver, and/or other wireless transceivers (not shown in FIG. 1).

The NAV system 70 is configured and/or programmed to determine a position of the vehicle 10. NAV system 70 is configured to measure and collect data including determine vehicle location, heading, speed, acceleration, and the like.

The NAV system 70 includes a Global Positioning System (GPS) receiver configured or programmed to triangulate a position or vehicle location of the vehicle 10 relative to satellites or terrestrial based transmitter towers associated with the GPS 72. The NAV system 70, therefore, is configured or programmed for wireless communication.

The NAV system 70 may be further configured or programmed to develop routes from a current vehicle location to a selected destination or receive such a route or selected destination from the server 40. In some instances, the NAV system 70 may develop the route to maximize fuel or battery efficiency, reduce travel time or distance, and the like.

The NAV system 70 and the BCM 60 (e.g., using AV control systems) may autonomously move and position the vehicle 10 at a location.

In addition, the TCU 66 generally includes wireless transmission and communication hardware that may be disposed in communication with one or more transceivers associated with telecommunications towers and other wireless telecommunications infrastructure. For example, the BLEM 74 is configured and/or programmed to receive messages from, and transmit messages to, one or more cellular towers associated with a telecommunication provider, and/or and a Telematics Service Delivery Network (SDN) associated with the vehicle 10 for coordinating vehicle fleet 8 (e.g., shown in FIG. 2).

The BLEM 74 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 74 may include Generic Attribute Profile (GATT) device connectivity for client devices that respond to or initiate GATT commands and requests, and connect directly with a mobile device.

The vehicles 10, road-side unit 12, drone 14, mobile device 20, and server 40 may be communicatively coupled to one another via one or more networks 92, which may communicate via one or more wireless channels 90, and/or may connect with one another directly (e.g., channel 94) using near field communication (NFC) protocols, Bluetooth® protocols, Wi-Fi, Ultra-Wide Band (UWB), and other possible data connection and sharing techniques. The vehicles 10, road-side unit 12, drone 14, mobile device 20, and server 40 also receive and/or are in communication with the Global Positioning System (GPS) 72.

The network 92 illustrates an example communication infrastructure in which the connected devices discussed in various embodiments of this disclosure may communicate. The network 92 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The vehicle 10 includes aspects of a power outage detection and response system 100. The power outage detection and response system 100 includes sensors including a camera 112 (e.g., a night vision camera) and a light sensor 114. The sensors measure a characteristic of an environment of the vehicle 10.

The power outage detection and response system 100 further includes computer executable instructions (e.g., modules 120, 130) that, when executed by the processor 32, cause the processor 32 to perform a method of detecting an indication of a power outage 200, 300. For example, the vehicle application 36 may include one or both of the modules 120, 130.

Figure 3:
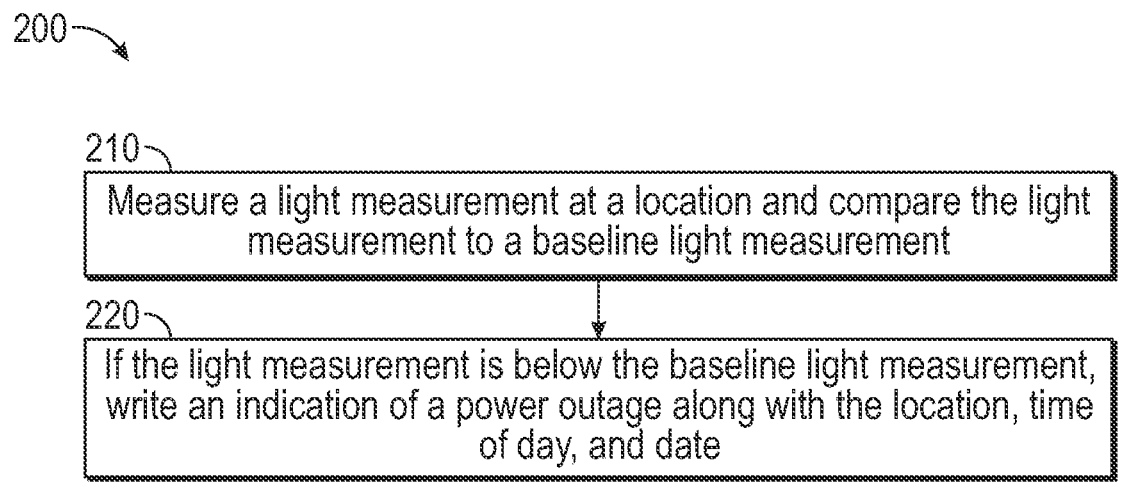
FIG. 3 is a flow chart of an example method of detecting of an indication of a power outage in accordance with the present disclosure.
Figure 4:
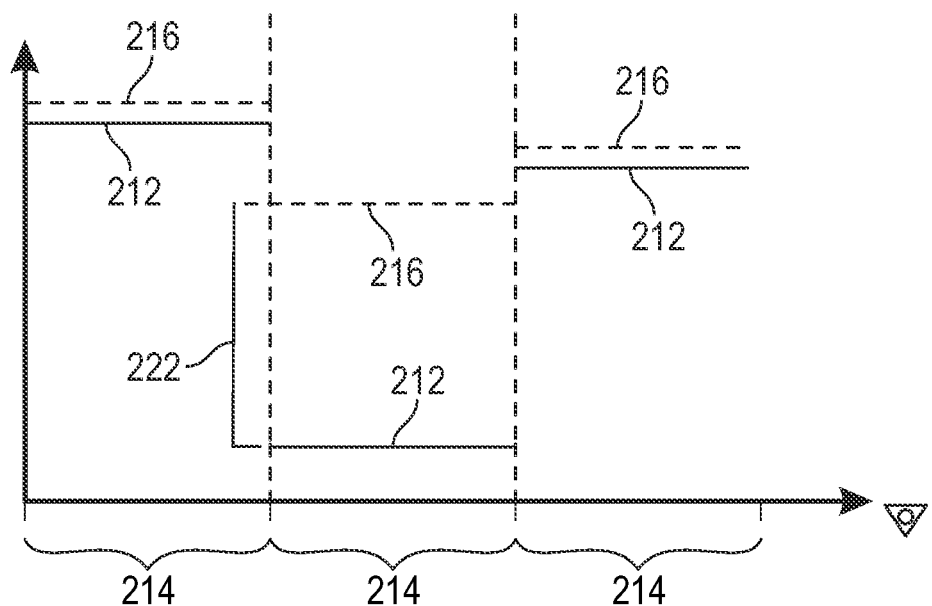
FIG. 4 is a graphical illustration of measurements of a sensor according to the method of FIG. 3 in accordance with the present disclosure.

Referring to FIGS. 2-4, according to a first step 210 of the method 200, the detection module 120 instructs the light sensor 114 (e.g., a LiDAR sensor) to measure a light measurement 212 (e.g., intensity of a LiDAR image) at a location 214 and compares the light measurement 212 to a baseline light measurement 216 for the location 214 and the date and time the measurement was taken. The baseline light measurement 216 reflects the light measurement that is expected (e.g., from a street light) in the absence of a power outage at the location 214 and the date and time of the measurement. In other words, a deviation from the baseline light measurement 216 represents an anomaly that may indicate a power outage.

Baseline light measurements 216 may be measured or otherwise determined based on location, time of day, and date. In some examples, vehicles 10 are controlled to measure a light measurement 212 at a location associated with a baseline light measurement 216.

According to a second step 220, if the light measurement 212 is below the baseline light measurement 216 (e.g., the light measurement 212 is substantially zero or below the baseline light measurement 216 by a threshold amount 222 that indicates a power outage), the detection module 120 writes an indication of a power outage along with the location, time of day, and date.

Figure 5:
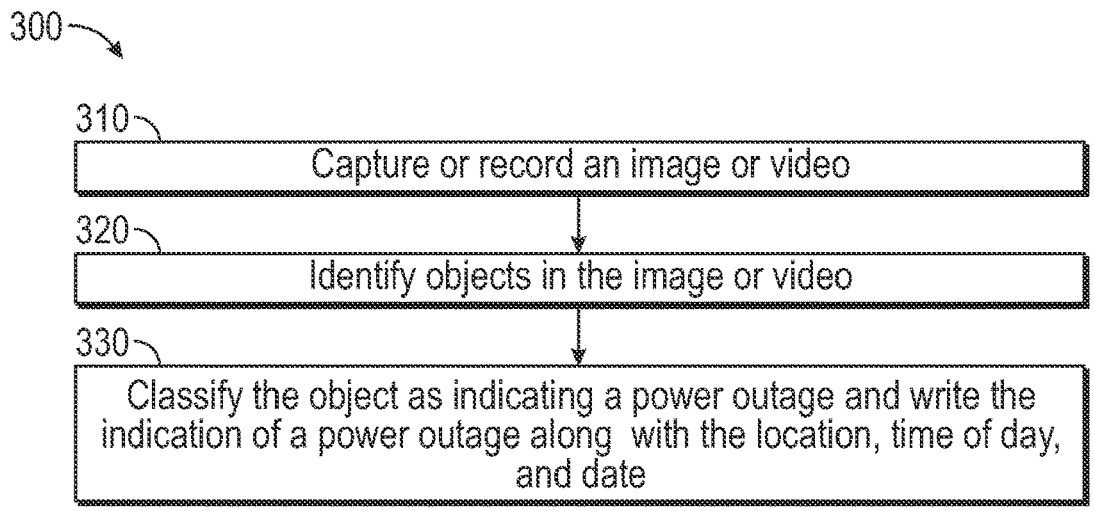
FIG. 5 is a flow chart of an example method of detecting an indication of a power outage in accordance with the present disclosure.
Figure 6:
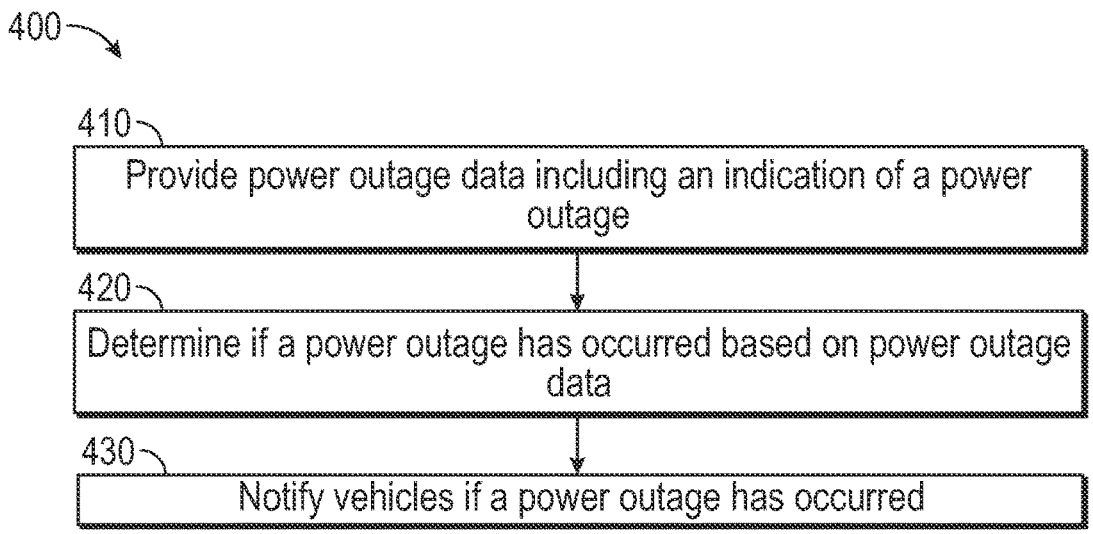
FIG. 6 is a flow chart of an example method of determining an occurrence of a power outage in accordance with the present disclosure.

Referring to FIGS. 2 and 5, according to a first step 310 of a detection method 300, the detection module 130 instructs the camera 112 (e.g., with night vision capability) to capture or record an image 312 or video.

According to a second step 320, the detection module 120 uses an object recognition application to identify objects 322 (e.g., objects configured to be illuminated in the absence of a power outage such as traffic lights, signs, street lights, and the like) in the image 312 or video.

According to a third step 330, the objects 322 are classified according to an image classification model 332 (or machine learning model) that is trained to determine if the images of the object 322 indicate a power outage. For example, if all of the lights of an image of a traffic light 322 are out, the image classification model 332 classifies the image of the traffic light 322 as indicating a power outage, and writes the indication of a power outage along with the location, time of day, and date.

For purposes of reference, the indication of a power outage, the location, the time of day, and the date are referred to as power outage data 340.

The power outage detection and response system 100 includes a system for determining an occurrence of a power outage based on the power outage data 340. Although the system for determining an occurrence of a power outage based on the power outage data 340 could be provided by the vehicle 10 or one of the other nodes of the network 2, for purposes of teaching, the system for determining an occurrence of a power outage is provided by the server 40. The server 40 may be operated by a utility company server or may be in communication with a utility company server.

The system for determining an occurrence of a power outage includes computer executable instructions (e.g., module 140), which, when executed by the processor 42, cause the processor 42 to perform a method of determining an occurrence of a power outage 400. For example, the server application 46 may include the module 140.

According to a first step 410 of the method 400, the vehicle 10 provides the power outage data 340 to the server 40. As described above, the power outage data 340 may be written to the blockchain (stored in a shared database utilizing blockchain technology) and the server 40 may read the power outage data 340 from the blockchain.

According to a second step 420, the module 140 determines if a power outage has occurred based on the power outage data 340. For example, the occurrence of a power outage may be determined based on the power outage data 340 from a single vehicle 10 at a single location 214, the power outage data 240 from a single vehicle 10 at different locations 214, and/or the power outage data 240 from multiple sources. The module 140 may require variation in at least one of the source node or location associated with the power outage data 340 to ensure that a determination of an occurrence of a power outage is statistically significant. In some examples, a confirmation may come from a utility company server or other server.

Here, the module 140 may use multiple entries to the blockchain. In addition, the determination module may use the locations 214 in the entries of power outage data 340 to estimate an area of the power outage.

As part of the second step 420, the module 140 may use the source and the location 214 in the first entry of power outage data 340 to request confirmation from other vehicles 10, humans via mobile devices 20, road-side units 12 (e.g., or other infrastructure with sensors), drones 14 with cameras or other sensors, and the like regarding the indication of a power outage in the power outage data 340. For example, the module 140 may determine whether nodes are in the area of the location 214 (e.g., road-side units 12 or mobile devices 20) and request confirmation of a power outage or instruct nodes (e.g., vehicles 10 or drones 14) to enter an area surrounding the location 214 to and perform the detection method 200 to determine whether illumination is degraded in the area surrounding the location 214 or if the initial assessment is faulty.

According to a third step 430, if the module 140 determines that a power outage has occurred based on the power outage data 340, the module 140 writes the determination of an occurrence of a power outage to the blockchain or may notify the nodes of the network 2 directly.

Figure 7:
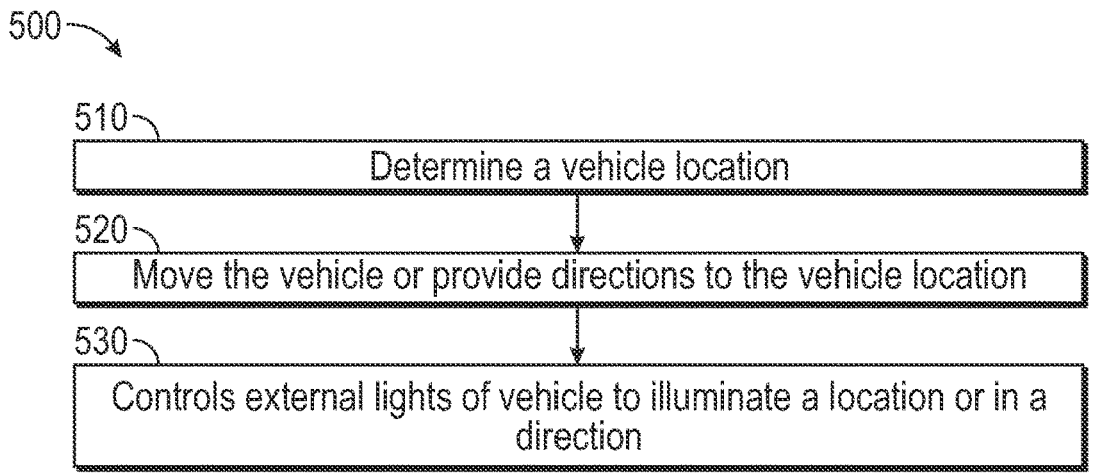
FIG. 7 is a flow chart of an example method of controlling a position and external lighting system of a vehicle in accordance with the present disclosure.

Referring to FIGS. 2 and 7, the power outage detection and response system 100 includes a positioning system and an external light control system of the vehicle 10. For example, in response to a determination that a power outage has occurred, the vehicle 10 is configured to enter a power outage mode and initiate the use of an external light control system and/or a vehicle positioning system. The positioning and external light control system includes computer executable instructions (e.g., module 150), which, when executed by a processor, cause the processor 32 to perform a method of controlling a position and external lighting system 500. For example, the vehicle application 36 may include the module 150.

According to a first step 510, the module 150 determines a vehicle location 512 and a vehicle orientation at the vehicle location 512. The vehicle location 512 and vehicle orientation are selected such that the vehicle 10 is able to provide illumination at an illumination location 514. For example, the server 40 may include a list of pre-determined illumination locations 514 (e.g., map locations) and the vehicle location 512 (e.g., map locations) and orientation (e.g., direction) associated with each illumination location 514. The illumination locations 514 may be selected by customers of a service (e.g., as organized by the server 40) that provides light during a power outage. For example, the service may be provided to a business or government to provide lighted pathways for employees or citizens. The locations may be selected to be high-pedestrian-traffic areas.

Figure 8:
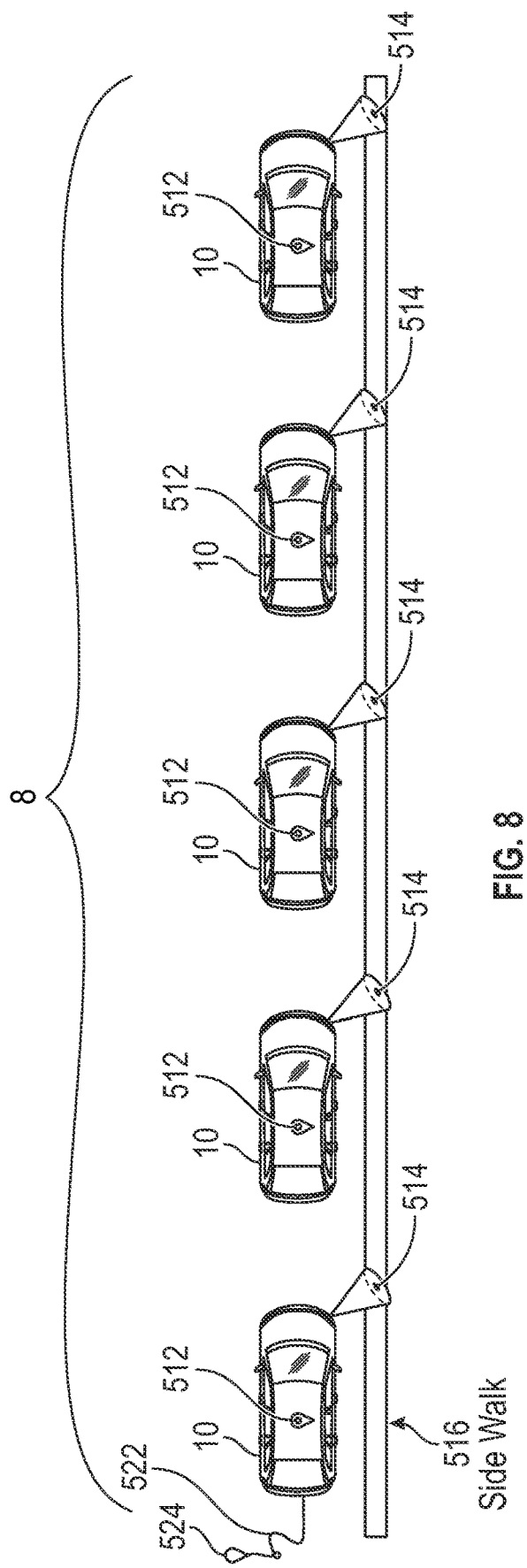
FIG. 8 is a schematic illustration of controlling a position and external lighting system of a fleet of vehicles according to the method of FIG. 7.

The fleet 8 of vehicles 10 may be assigned (e.g., via direct communication) a vehicle location 512 and orientation by the server 40 (e.g., based on the current location of the vehicle 10 and optimizing for time or distance). Alternatively, the server 40 may write the vehicle locations 512 and orientations to the blockchain to be read by the vehicles 10. Referring to FIG. 8, a fleet 8 of vehicles 10 are controlled in a coordinated manner to be at vehicle locations 512 and orientations to illuminate illumination locations 514 on a sidewalk 516.

The drone 14 may be used to determine illumination locations 514. For example, the drone 14 may map out areas of low luminosity.

In some cases, the vehicles 10 are not positioned in a fixed location but rather move around the areas of low luminosity at a low speed with lights on to illuminate illumination locations.

According to a second step 520, the module 150 generates and executes instructions to move the vehicle 10 to the vehicle location 512 and in the orientation. For example, the NAV system 70 generates a route 522 from a current location 524 to the vehicle location 512 and AV control systems (e.g., BCM 60) of the vehicle 10 operate the vehicle 10 to autonomously move the vehicle 10 along the route 522 to the vehicle location 512. Alternative, the NAV system 70 may provide directions to a driver.

In some cases, the vehicle 10 may not move and initiates a power outage mode on instruction from the server 40 or another vehicle.

Figure 9:
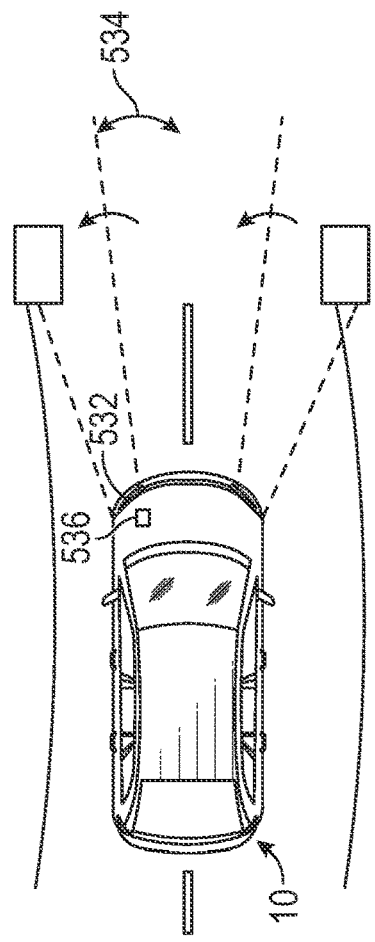
FIG. 9 is a schematic illustration of controlling an external lighting system of a vehicle according to the method of FIG. 7.

At the location 512, according to a third step 530, the module 150 controls external lights to illuminate the illumination location 514 or in a direction 518. Referring to FIG. 9, the external lights may include adaptive headlights 532 that adjust an angle 534 or rotate (e.g., adjusted or rotated through the control of motors 536), cornering lights, and side directed lamps. The cornering lights can include fog lights with small reflectors that swivel to direct the fog lights off to the side. The headlights 532 are also directed downward toward the surface (e.g., low beam).

The external lights are turned on and adjusted as necessary to illuminate an illumination location 514 or to provide illumination in a direction 518 or area around the vehicle 10. For example, the BCM 60 controls the electric motors 536 of the adaptive headlights 532, the swivel of the reflectors of the fog lights, and/or certain of the side-directed lamps to adjust the illumination location or direction of the lights.

The vehicles 10 monitor their battery status while in power outage mode. The lights may operate in a low-beam or low-power mode to conserve battery energy and fuel. An AV gas engine may be turned on to charge a battery of the vehicle 10.

In driving operation, adaptive headlights 532 adjust an angle or rotate based on the steering, speed and elevation of the vehicle 10 to illuminate the road ahead. For example, when the vehicle 10 turns right, the headlights 532 angle 534 to the right. The vehicle 10 includes electronic sensors to detect the speed of the car, how far the driver has turned the steering wheel, and the yaw of the car. Yaw is the rotation of the car around a vertical axis. The sensors direct small electric motors 536 to adjust the headlights 532. As an example, an adaptive headlight 532 can adjust up to 15 degrees from center (e.g., a 30-degree range of movement)

Referring to FIG. 2, at the third step 530, the module 150 may determine a location 514 and/or a direction 518 around the vehicle 10 to illuminate using a sensor 544. For example, the sensor 544 detects motion of a pedestrian 546 and the module 150 control the external lights as above to illuminate a path of the pedestrian 546.

The sensor 544 may include, for example, a LiDAR sensor, a sensor that monitors network connections to wireless devices (e.g., mobile device 20), a motion detection sensor, camera 112, a microphone, and the like.

A method 600 of detection and verification of an end of a power outage can occur with steps similar to the methods 200, 300, 400.

Figure 10:
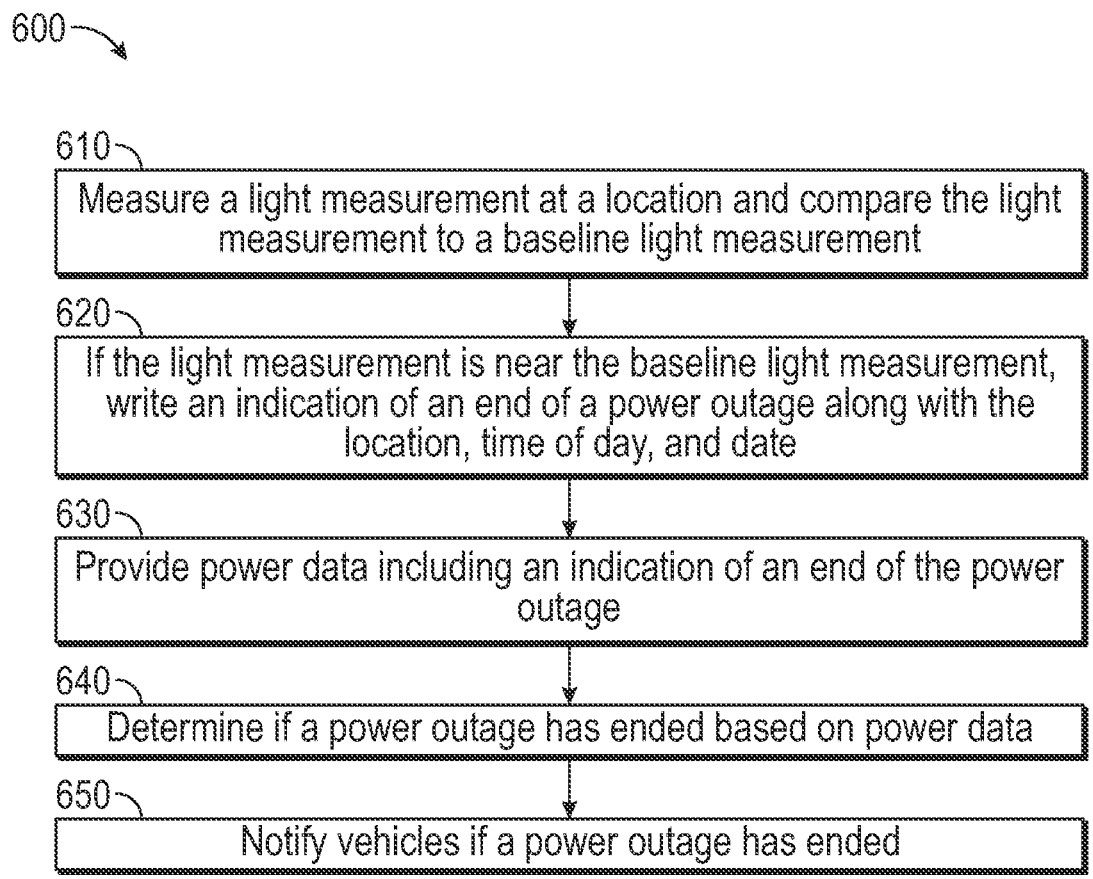
FIG. 10 is a flow chart of an example method of detecting an indication of an end of a power outage and determining an end of a power outage in accordance with the present disclosure.

Referring to FIGS. 2, 4, and 10, according to a first step 610 of the method 600, the detection module 120 instructs the light sensor 114 (e.g., a LiDAR sensor) to measure a light measurement 212 (e.g., intensity of a LiDAR image) at a location 214 and compares the light measurement 212 to a baseline light measurement 216 for the location 214 and the date and time the measurement was taken. The baseline light measurement 216 reflects the light measurement that is expected (e.g., from a street light) in the absence of a power outage at the location 214 and the date and time of the measurement.

According to a second step 620, if the light measurement 212 is near the baseline light measurement 216 (e.g., the light measurement 212 is near the baseline light measurement 216 or is below the baseline light measurement 216 by less than a threshold amount 222), the detection module 120 writes an indication of an end of a power outage along with the location, time of day, and date. For purposes of reference, the indication of an end of a power outage, the location, the time of day, and the date are referred to as power data 622.

Additionally or alternatively, the image classification model 332 classifies an image of an object (e.g., the traffic light 322) as indicating an absence of a power outage and write an indication of an end of the power outage, and records the location, time of day, and date.

According to a third step 630, the vehicle 10 provides the power data 622 to the server 40. As described above, the indication may be written to the blockchain (stored in a shared database utilizing blockchain technology) and the server 40 may read the indication from the blockchain.

According to a fourth step 640, the module 140 determines if a power outage has ended based on the power data 622. As above, the module 140 may require variation in at least one of the source node or location associated with the power data 622 to ensure that a determination of an end of a power outage is statistically significant. In some examples, a confirmation may come from a utility company server or other server.

As part of the fourth step 640, the module 140 may use the source and the location 214 in the first entry of power data 622 to request confirmation from other vehicles 10, humans via mobile devices 20, road-side units 12 (e.g., or other infrastructure with sensors), drones 14 with cameras or other sensors, and the like regarding the indication of a end of a power outage in the power data 622. For example, the module 140 may determine whether nodes are in the area of the location 214 (e.g., road-side units 12 or mobile devices 20) and request confirmation of an end of the power outage or instruct nodes (e.g., vehicles 10 or drones 14) to enter an area surrounding the location 214 to and perform the steps 610, 620 to determine whether illumination is restored in the area surrounding the location 214 or if the initial assessment is faulty.

According to a fifth step 650, if the module 140 determines that a power outage has ended based on the power data 622, the module 140 writes the determination of an end of a power outage to the blockchain or may notify the nodes of the network 2 directly. Upon reading the determination, the vehicles 10 end the power outage mode.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A method, comprising:
   measuring, by a sensor of a vehicle, a characteristic of an environment of the vehicle;
   determining, based on the characteristic, an indication of a power outage; and
   controlling, by the vehicle, an external lighting system of the vehicle to illuminate a location around the vehicle, wherein the sensor is a light sensor and the indication of the power outage is determined by comparing a measurement of the light sensor to a baseline measurement of the light sensor.

2. The method of claim 1, wherein the controlling the external lighting system of the vehicle includes determining, by the sensor of the vehicle, the location to illuminate.

3. The method of claim 1, wherein the controlling the external lighting system of the vehicle includes receiving a map location to illuminate.

4. The method of claim 3, further comprising changing the location or orientation of the vehicle to illuminate the location.

5. The method of claim 1, further comprising sending the indication of the power outage to a server.

6. The method of claim 5, wherein the server determines an occurrence of the power outage based on the indication of the power outage.

7. The method of claim 6, wherein the server determines the occurrence of the power outage based on a confirmation of the indication of the power outage from another vehicle, a mobile device, a road-side unit, and/or a drone.

8. The method of claim 6, wherein the indication of the power outage is a first indication of the power outage, and wherein the server determines the occurrence of the power outage based on the first indication of the power outage and a second indication of the power outage from another vehicle, a mobile device, infrastructure, and/or a drone.

9. The method of claim 8, wherein the server determines an area of the power outage based on the indication of the power outage from one or more vehicles in a fleet of vehicles.

10. The method of claim 6, wherein the controlling of the external lighting system of the vehicle is initiated in response to reading the occurrence of the power outage.

11. The method of claim 6, wherein the server sends a plurality of map locations to illuminate to a plurality of vehicles.

12. The method of claim 1, further comprising writing the indication of the power outage to a shared database, wherein a fleet of vehicles and a server are nodes of a network and each node includes a copy of the shared database.

13. A method, comprising:
   measuring, by a sensor of a vehicle, a characteristic of an environment of the vehicle;
   determining, based on the characteristic, an indication of a power outage;

sending the indication of the power outage to a server; and
controlling, by the vehicle, an external lighting system of the vehicle to illuminate a location around the vehicle, wherein the server determines an occurrence of the power outage based on the indication of the power outage, and wherein the indication of the power outage is a first indication of the power outage, and wherein the server determines the occurrence of the power outage based on the first indication of the power outage and a second indication of the power outage from another vehicle, a mobile device, infrastructure, and/or a drone.

14. The method of claim 13, wherein the server determines an area of the power outage based on the indication of the power outage from one or more vehicles in a fleet of vehicles.

15. A method, comprising:
measuring, by a sensor of a vehicle, a characteristic of an environment of the vehicle;
determining, based on the characteristic, an indication of a power outage;
controlling, by the vehicle, an external lighting system of the vehicle to illuminate a location around the vehicle; and
writing the indication of the power outage to a shared database, wherein a fleet of vehicles and a server are nodes of a network and each node includes a copy of the shared database.

16. A vehicle, comprising:
a sensor for measuring a characteristic of an environment of the vehicle;
an external lighting system;
a processor;
a memory comprising computer-executable instruction that, when executed by the processor, cause the processor to:
determine, based on the characteristic, an indication of a power outage;
send the indication of the power outage to a server;
receive a determination of the power outage;
control, in response to receiving the determination of the power outage, the external lighting system of the vehicle to illuminate a location around the vehicle.

17. The vehicle of claim 16, wherein the sensor is a light sensor, wherein the memory includes a baseline measurement of the light sensor, and wherein the indication of the power outage is determined by comparing a measurement of the light sensor to the baseline measurement of the light sensor.

18. The vehicle of claim 16, wherein the sensor is a camera, wherein the memory includes an image classifier model, and wherein the indication of the power outage is determined by analyzing an object in an image of the environment with the image classifier model.

19. The vehicle of claim 16, wherein to determine the location to illuminate, the processor is configured to:
determining, based on the sensor of the vehicle, the location to illuminate; and
receiving a map location to illuminate.

20. A method, comprising:
measuring, by a sensor of a vehicle, a characteristic of an environment of the vehicle;
determining, based on the characteristic, an indication of a power outage; and
controlling, by the vehicle, an external lighting system of the vehicle to illuminate a location around the vehicle, wherein the sensor is a camera and the indication of the power outage is determined by analyzing an object in an image.

21. The method of claim 20, wherein analyzing the object in the image includes classifying the image by an image classification model.

22. A method, comprising:
measuring, by a sensor of a vehicle, a characteristic of an environment of the vehicle;
determining, based on the characteristic, an indication of a power outage; and
controlling, by the vehicle, an external lighting system of the vehicle to illuminate a location around the vehicle, wherein the controlling the external lighting system of the vehicle includes receiving a map location to illuminate.

23. The method of claim 22, further comprising changing the location or orientation of the vehicle to illuminate the location.

* * * * *